United States Patent [19]

Moore

[11] 4,017,216

[45] Apr. 12, 1977

[54] VARIABLE UNDERSPEED SYSTEM LINKAGE

[75] Inventor: Huber A. Moore, Geneva, Ill.

[73] Assignee: Caterpillar Tractor Co., Peoria, Ill.

[22] Filed: Mar. 15, 1976

[21] Appl. No.: 666,723

[52] U.S. Cl. .................................. 417/216; 60/423; 60/428; 60/447; 417/326

[51] Int. Cl.² .................... F04B 49/00; F16D 31/02

[58] Field of Search ............. 417/34, 216, 218–222, 417/326; 60/423, 428, 447, 465, 494

[56] References Cited

UNITED STATES PATENTS 3,963,378 6/1976 McMillan .......................... 417/216

*Primary Examiner*—Carlton R. Croyle
*Assistant Examiner*—G. P. LaPointe
*Attorney, Agent, or Firm*—Phillips, Moore, Weissenberger, Lempio & Majestic

[57] ABSTRACT

A hydraulic power system having a plurality of variable displacement pumps for supplying pressurized fluid for manipulation of one or more implements includes control means operative to automatically adjust pump displacement to the output horsepower of a prime mover driving the pumps of the system. The control system includes an underspeed valve responsive to a deviation in the speed of the prime mover from any of a wide range of selected speeds to transmit a fluid pressure signal to servocontrol means for adjusting the displacement of the pumps. The underspeed control means includes an infinitely variable orifice connected by way of lost motion linkage to the engine throttle control for adjusting the underspeed valves to respond to a deviation of an infinite range of engine speeds.

3 Claims, 2 Drawing Figures

VARIABLE UNDERSPEED SYSTEM LINKAGE

BACKGROUND OF THE INVENTION

The present invention is directed to hydraulic control systems, and pertains more particularly to an improvement in control systems such as in application Ser. No. 583,366 entitled Part Throttle Control - Pump Override, now U.S. Pat. No. 3,963,378, assigned to the assignee hereof and having a plurality of variable displacement pumps and means for automtically adjusting the displacement of the pumps to engine output.

Many hydraulically actuated implements, such as a hydraulic excavator, normally employ a plurality of variable displacement pumps for supplying the high-pressure hydraulic fluid necessary to power the many motors employed in manipulating the excavator bucket and linkage. Reference is made to U.S. Pat. No. 3,841,795 issued Oct. 15, 1974 to Ferre et al., assigned to the assignee hereof, for background material pertinent to the subject invention. The above patent was developed to overcome certain problems of the prior art and functions very satisfactorily so long as a single predetermined engine speed or engine normal operating speed is selected and maintained.

Earth-moving machines, such as the hydraulic excavator, are normally designed to have a predetermined normal operating speed of the engine during normal operation of the machine. With such machines the engine throttle is normally set at a predetermined position when the machine is in normal operation.

Frequently, it is desirable to operate the vehicle at other than normal engine speed. This becomes a problem when the hydraulic system is equipped with a control system such as that of U.S. Pat. No. 3,841,795. With such a system, as soon as the engine speed is reduced, the differential pressure across the underspeed valve orifices would respond as though the engine was running slower due to lugging, and signal the pumps of the system to stroke to a lower output. Thus, one would be unable with that system to operate the vehicle with the engine at a lower speed and at the same time obtain full pump flow from the pumps.

Copending application Ser. No. 583,366 entitled Infinitely Variable Orifice for Part Throttle Control by R. G. Butler, and of common assignment herewith discloses a system wherein the response to the underspeed is made infinitely variable with engine throttle control. However, it has been learned that it is desirable to deter response of the underspeed valve until the engine has attained a certain minimum speed. Thus, the present invention has been devised to accomplish this end.

SUMMARY AND OBJECTS OF THE INVENTION

It is the primary object of the present invention to provide horsepower controlling means for a hydraulic system that overcomes the above problems of the prior art.

Another object of the present invention is to provide improved linkage for horsepower controlling means for hydraulic systems having a plurality of variable displacement pumps with infinitely variable speed-responsive means to adjust the speed-responsive means of this system to a plurality of predetermined operating speeds.

In accordance with the primary aspect of the present invention, a hydraulic control system having a plurality of variable displacement pumps, and an infinitely variable underspeed valve means responsive variable with engine throttle to the output of the engine is provided with linkage interconnecting the engine throttle and variable means for the underspeed valve so that the engine speed can be advanced a predetermined amount before adjustment of the underspeed valve begins.

BRIEF DESCRIPTION OF THE DRAWINGS

The above and other objects and advantages of the present system will become apparent from the following description when read in conjunction with the drawings, wherein.

DETAILED DESCRIPTION OF THE PREFERRED EMBODIMENT

Figure 1:
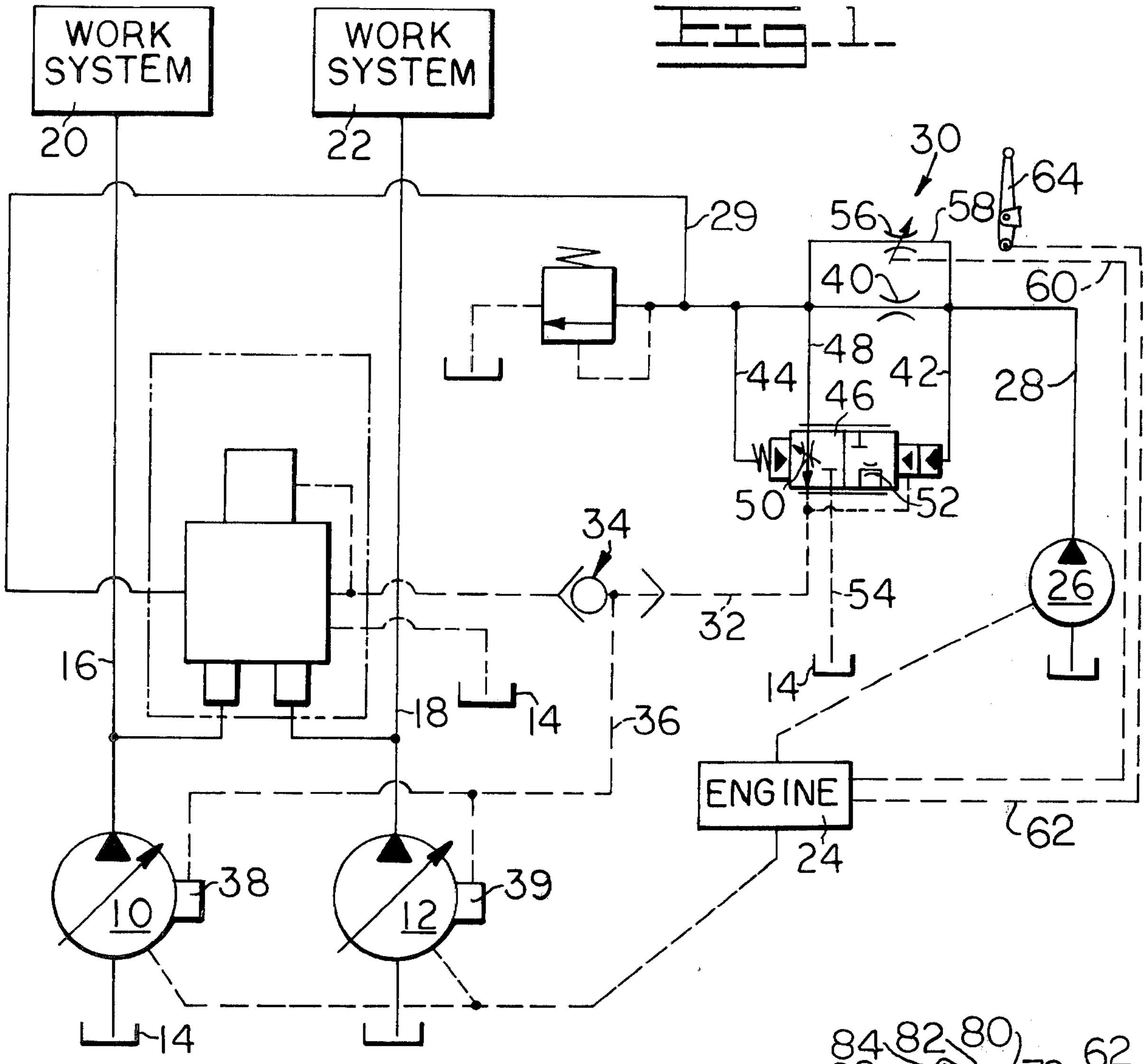
FIG. 1 is a schematic layout of the hydraulic control system embodying the present invention.

Referring to the drawing, a hydraulic control system embodying the present invention is schematically illustrated in operative combination with a multiple pump implement control circuit, a portion of which is illustrated. The implement control circuit is of the type that would be utilized in a machine such as a hydraulic excavator or the like wherein a plurality of hydraulic motors are used in combination individually and/or simultaneously for the manipulation of an implement.

The system comprises a plurality of variable displacement pumps 10, 12 which draw fluid from the reservoir 14 and supplies, by way of output or supply lines or conduits 16, 18, respectively, to work systems 20, 22. Work systems 20, 22 may be any suitable arrangement of valves and motors for providing power for operation of implements or the like such as that illustrated, for example, in U.S. Pat. No. 3,759,292 issued Sept. 18, 1973, which is incorporated herein by reference.

The pumps 10 and 12 are variable displacement pumps and are driven by common prime mover means such as an internal combustion engine 24 which is operatively connected to drive a fixed displacement pump 26 which supplies pilot fluid for performing certain control functions within the system. Among these functions are the control of the variable displacement pumps 10, 12. Pilot fluid from the pump 26 is supplied by way of a pilot supply line 28 to an underspeed valve assembly indicated generally at 30 which is operative under certain conditions to transmit a signal by way of the pilot control line 32, a shuttle valve 34, a pilot control line 36 to servocontrol means of actuators 38 and 39 of the pumps 10, 12, respectively. The servo actuators are responsive to certain pressure signals to reduce the displacement of the respective pumps 10 and 12.

The underspeed valve assembly 30 includes a primary orifice 40 which receives flow by way of conduit 28, causing a differential pressure, which pressure is communicated by way of conduits 42, 44 to the ends of pressure-controlled pilot valve 46. This signal pressure communicated by way of the conduits 42, 44 acts on pressure-controlled pilot valve 46 to shift it to various positions including the position shown wherein pilot fluid is communicated by way of a passage 48 and across the adjustably restricted passage 50 of the valve to the pilot control line 32 which is then communicated to the pump's servo actuators 38, 39 for reducing the displacement of the pumps. The pressure-controlled pilot valve 46 includes a variably restricted passage 50 for communicating between pilot passage 48 and pilot control line 32 when the valve 46 is in a certain position as illustrated. A restricted passage 52 provides communication between the pilot control line 32 and a return passage 54 to tank 14 for venting passage 32 and pilot control line 36.

The underspeed valve 30 also includes an infinitely variable orifice 56 which is in parallel with the orifice 40 and connected to the engine throttle to adjust the signal pressure for positioning the pressure-responsive pilot valve 46 for a large range of operating speeds of the engine 24. For example, when the vehicle engine is running at a predetermined or selected operating speed, the pilot pump is producing a predetermined amount of flow to the control system. The pressure differential across the orifice 40 is an amount necessary to maintain the pressure-responsive pilot valve 46 in its unloading position, that is, with pilot control line 32 communicating with return passage 54, thus resulting in relieving pressure signal against the servocontrol actuators 38, 39. As the engine speed drops in response to a load on the system, the pilot pump 26 begins to slow down and produces less fluid flow through pilot supply line 28 and across orifice 40, the pressure differential will cause shifting of the pressure-responsive pilot valve 46 to the position as shown and will communicate a modified pilot pressure to the pump servocontrols 38, 39 by way of the conduits 48, 32, 34 36 for the stroking of the pumps 10, 12 to some angle which will allow the engine to regain its normal speed.

The infinitely variable orifice 56 is placed on a line 58 parallel to the orifice or restriction 40. This arrangement allows an adjustment of the effective orifice between pilot supply line 28 and the pilot line 29, which is a continuation downstream of valve 30. Thus, with the variable orifice or restriction 56, the pressure drop between lines 42, 44 may be infinintely varied to vary the response to the valve 46 in response to the speed of the vehicle engine and output of the pump 26.

In this embodiment, the variable restriction or orifice 56 is connected to suitable linkage means 60, which in turn is connected to throttle linkage 62 and throttle control lever 64 for controlling the speed of the engine 24. The setting of the variable orifice 56 is made infinitely variable and is directly related to the throttle setting for the engine. Thus, the underspeed valve 30 is immediately adjusted to the speed of the engine so that the underspeed valve responds normally to any throttle setting of the engine within limits. Thus, the underspeed valve assembly, in this embodiment, would be automatically responsive to a deviation from any predetermined engine speed which engine speed is predetermined automatically by the throttle or governor setting.

Figure 2:
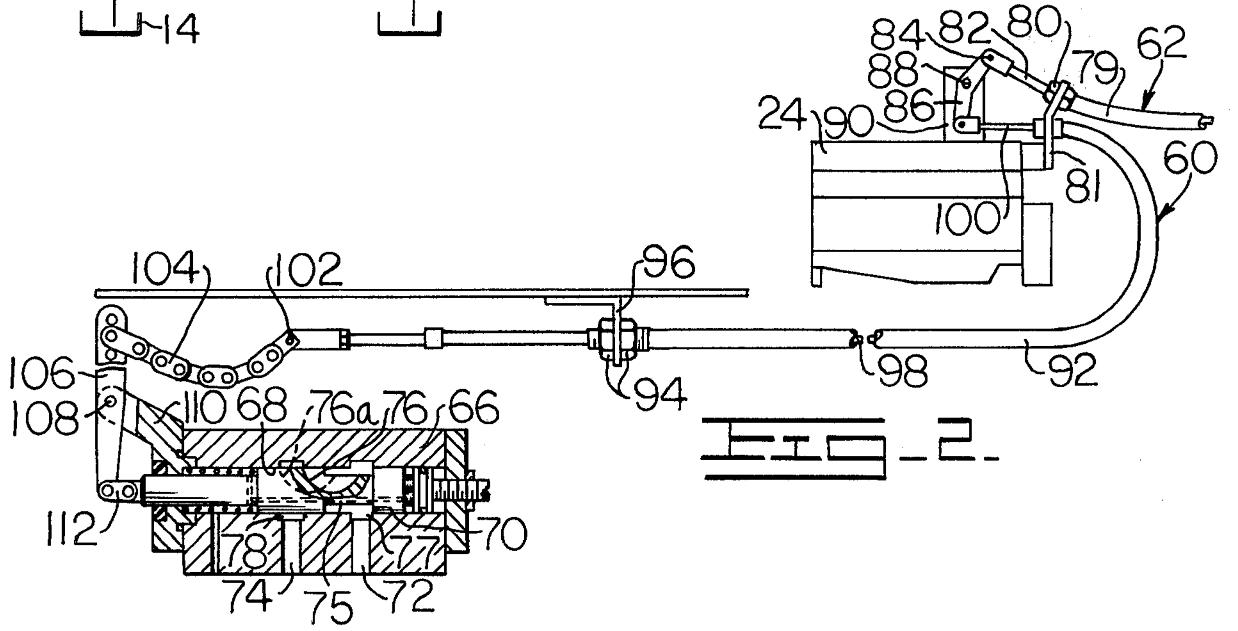
FIG. 2 is a schematic illustration of a control linkage system in accordance with the present invention.

Turning now to FIG. 2 of the drawing, there is illustrated an embodiment of a variable orifice as in the present invention. The variable orifice arrangement comprises a housing 66 comprising or including a central cylindrical through-bore 68 in which a valve spool 70 is reciprocably mounted. An inlet 72 and an outlet 74 communicate with the through-bore. The valve spool 70 includes an annular groove 75 and a longitudinal slot 76 cooperating therewith for providing communication between the inlet 72 and the outlet 74.

The slot 76 extends from the annular groove portion 75 of the spool 70 to the adjacent cylindrical body of the spool and variably communicates between annular grooves 77, 78 formed in the bore 68 which communicate respectively with inlet 72 and outlet 74. The spool 70 is preferably mounted within bore 68 such that a forward edge **76*a* of slot 76 is covered by the walls of the bore 68 preventing communication of fluid between passages 72, 74. As the spool 70 is progressively moved leftward, the forward edge 76*a* of slot 76 is gradually uncovered progressively enlarging the passage made by slot 76 between passages 72, 74**.

The spool 70 includes a longitudinal slot 76 which provides variable communication between inlet 72 and outlet 74. The spool 70 is connected by suitable linkage means 60, 62 to engine throttle or governor control lever 64. The link 62 may be, for example, a wire cable having an outer stationary sleeve 79 connected at one end with suitable adjustable means 80 to a bracket 81 or engine 24. An internal cable 82 is slidably mounted within sleeve 79 and connected at one end 84 to a lever 86 connected to a governor shaft 88 of governor 90 of engine 24. The terms throttle and governor have been used interchangeably herein since they both have the same effect of regulating engine speed.

A second wire type cable 60 includes an outer sleeve 92 connected at one end to bracket 81 and at the other end by adjustable means 94 to a bracket 96. An internal cable 98 is slidably mounted in sleeve 92 and connected at one end 100 to lever 86 and at the other end 102 to a lost motion link member 104 which in turn is connected to a lever 106.

The lever 106 is pivotally mounted by a pin 108 on a bracket 110 on valve body 66. The lower end of lever 106 is connected by a link 112 to spool 70 of the variable orifice.

The lost motion link 104, as illustrated, is a chain having sufficient slack that permits the engine throttle or governor control lever 86 to be advanced à predetermined amount prior to movement of lever 106 of spool 70. This permits the engine r.p.m. to be advanced to a predetermined minimum speed above idle before the underspeed valve becomes effective. Thus, the lower and upper range of effectiveness of the variable underspeed control system is established.

Thus, from the above description it is seen that there is provided a hydraulic control system having a variable underspeed valve that is adjustable over a predetermined range of engine speed including a linkage that permits the engine throttle to be advanced to a predetermined speed before the underspeed system becomes effective to alter displacement of variable displacement pumps within the system.

I claim:

1. A hydraulic system comprising the combination of a plurality of variable displacement pumps driven by a single prime mover, and a horsepower-controlling system for controlling the horsepower output of the variable displacement pumps, including a source of pilot pressure including a fixed displacement pump driven by a prime mover for controlling displacement of said pumps in relation to the speed output of said prime mover, throttle control means for controllably selecting the speed of said prime mover, underspeed control valve means responsive to a deviation from selected operating speeds of said prime mover for normally controlling the communication of said pilot control pressure with said pump displacement means to thereby vary the displacement of said pumps in proportion to loads thereon, and infinitely variable means movable with said throttle control means for adjusting the response of said underspeed valve to respond to a deviation from said operating speed, the improvement comprising:

lost motion linkage means connecting said infinitely variable means to said throttle control means for movement of said infinitely variable means with said throttle control means only after said throttle control means has advanced a predetermined amount.

2. The hydraulic system of claim 1 wherein said variable means comprises variable flow control means including valve means connected in parallel with said underspeed control valve means, said valve means connected to said throttle control means by said lost motion linkage means for adjusting the flow of fluid through said underspeed control valve means.

3. The hydraulic system of claim 2 wherein said lost motion means is a chain having sufficient slack for said engine throttle to advance to a predetermined minimum speed of said prime mover prior to movement of said valve means.

* * * * *